United States Patent [19]

Sick

[11] Patent Number: 4,820,033
[45] Date of Patent: Apr. 11, 1989

[54] SOLAR MIRROR APPARATUS

[75] Inventor: Erwin Sick, Icking, Fed. Rep. of Germany

[73] Assignee: Erwin Sick GmbH Optik-Elektronik, Waldkirch, Fed. Rep. of Germany

[21] Appl. No.: 137,209

[22] Filed: Dec. 23, 1987

[30] Foreign Application Priority Data

Dec. 30, 1986 [DE] Fed. Rep. of Germany ....... 3644759

[51] Int. Cl.⁴ ............................ G02B 5/10; F24J 3/02
[52] U.S. Cl. .................................... 350/613; 126/438; 248/488; 350/628
[58] Field of Search ............... 126/424, 438, 442, 444, 126/450; 350/607, 608, 609, 611, 613, 628, 632, 637; 248/476, 488

[56] References Cited

U.S. PATENT DOCUMENTS

| 4,071,017 | 1/1978 | Russell, Jr. et al. | 350/613 |
| 4,106,484 | 8/1978 | Dame | 350/628 |
| 4,127,926 | 12/1978 | White | 350/628 |
| 4,135,493 | 1/1979 | Kennedy | 350/628 |
| 4,139,270 | 2/1979 | Dotson | 350/628 |
| 4,268,332 | 5/1981 | Winders | 350/628 |
| 4,293,192 | 10/1981 | Bronstein | 350/628 |
| 4,390,241 | 6/1983 | Trihey | 350/628 |
| 4,515,148 | 5/1985 | Boy-Marcotte et al. | 350/628 |

Primary Examiner—John K. Corbin
Assistant Examiner—Martin Lerner
Attorney, Agent, or Firm—Townsend & Townsend

[57] ABSTRACT

The solar mirror apparatus has an elongate support frame on which resiliently flexible sheet metal mirrors (15) are secured in a parabolically curved arrangement, with an elongate solar radiation receiver (28) being mounted at the focal line of the sheet metal mirrors (15). The support frame is swivellable about an axis which extends parallel to the focal line of the parabola. The carrying frame has two spaced apart clamping section supports (11) disposed opposite and parallel to one another. The mirror plates are carried by parabolic webs (13) with the mirror plates being fitted shapewise on the parabolic edges (17) of the parabolic webs (12). The ends of the parabolic webs (12) which extend between the clamping section supports (11) are swivellably supported at the confronting sides of the clamping section supports (11) about swivel axes (14) which extend parallel to the longitudinal axes (13) of the clamping section supports (11). The clamping section supports (11) have an elongate abutment (16) which extends parallel to the swivel axis (14) at the side of the swivel axis facing the parabolic edges (17). The end edges of the mirror plates (15) contacting the abutment (16), whereby the mirror plates (15) are held in compression and their shape is determined by the parabolic webs (13).

12 Claims, 6 Drawing Sheets

SOLAR MIRROR APPARATUS

The invention relates to a solar mirror apparatus comprising an elongate carrying frame on which there are secured a parabolically curved arrangement of elastically flexible mirror plates, in particular sheet metal mirrors, and an elongate radiation receiver disposed at the focal line of the mirror plates, with the arrangement being swivellable about an axis extending parallel to the focal line of the parabola.

Such solar mirror arrangements are in particular used in sunny countries for the exploitation of solar energy. Large area mirror arrangements are necessary in order to generate as much energy as possible. The manufacture of such mirror arrangements is however associated with considerable expense.

The principle object underlying the present invention is thus to provide a solar mirror arrangement of the initially named kind with which large area sunlight receiving surfaces can be realized at low weight and with an optical quality which is as high as possible, without the expense and complexity involved in the manufacture of the solar mirror arrangement being excessively high. In particular components should be used as far as possible which are available in price-worthy form in the market place, without the optical quality of the mirror arrangement, i.e. the exactness of the concentration of the sunlight onto the solar receiver, being impaired. Moreover, the mirror plates should be capable of being exchanged and replaced by new ones in simple manner in the event of damage, or of them becoming dirty, or otherwise impaired. In operation the solar mirror arrangement should be stable and operationally reliable even over long periods of operation and when exposed to considerable temperature differences between day and night.

In order to solve this problem the invention provides that the carrying frame has two spaced apart clamping section supports disposed opposite and parallel to one another; that the mirror plates are carried by parabolic webs with the mirror plates being fitted shapewise on the parabolic edges of the parabolic webs; that the ends of the parabolic webs which extend between the clamping section supports are swivellably supported at the confronting sides of the clamping section supports about swivel axes which extend parallel to the longitudinal axes of the clamping section supports; that the clamping section supports have an elongate abutment which extends parallel to the swivel axis at the side of the swivel axis facing the parabolic edges, with the end edges of the mirror plates contacting the abutments, whereby the mirror plates are held in compression; and that by releasing and swivelling the or each clamping section support about the swivel axis the abutment can be released from the end edges.

The concept underlying the invention has thus to be seen in the fact that resiliently flexible structures, in particular sheet metal mirrors are used as the mirror plates which from the outset do not have any defined surface shape. The parabolic surface is on the contrary achieved in accordance with the invention by the parabolic edges of the very narrow parabolic webs which are arranged at suitable spacings alongside one another on the support frame, with the mirror plates being pressed against the parabolic edges of the parabolic webs, in the sense of being compressed, in such a way that the mirror plates contact the parabolic edges of the parabolic webs in form fitted manner. In order to bring about this form fitted contact in simple manner, i.e. to make the installation and dismantling of the mirror plates as easy as possible, clamping section supports are used which make it possible to simply lay in place the mirror plates, which have initially been only approximately curved in parabolic manner, with the compression of the mirror plates and the form shaped contact with the parabolic edges of parabolic webs then taking place during subsequent pivoting of the clamping section supports, with the parabolic webs having been previously pivotally connected to the clamping section supports. On inserting the non-precurved mirror plates these will be bent as a result of their own weight into a provisional parabolic shape.

A practical realisation of the concept underlying the invention provides that the clamping section support should have an essentially hollow cylindrical basic shape and should have a groove-like cut-out at the side which supports the mirror plates, with one of the corner edges of the groove-like cut-out forming the abutment. With this arrangement provision should in particular be made that the clamping section support has an elongate slot at its side which supports the mirror surfaces, with sliders which support a pivot bearing defining the swivel axis being longitudinally displaceably held in the longitudinal slot. The longitudinal slot is preferably located at the center of the groove-like cut-out, at the base thereof.

Futhermore, it is advantageous for the sliders to be fixable in any position along the clamping section supports. In this manner the sliders can be displaced after installation of the clamping section supports to the position where the parabolic webs are to be arranged to support the mirror plates, and can be fixed there.

A practical embodiment is characterized in that a swivel trunnion connected to the ends of a parabolic web engages into the rotary bearing. With this arrangement it is in particularly expedient when the rotary bearing and the swivel pin can be clamped against one another, essentially in the direction of the tangent to the parabolic surface at this point, in that direction in which the end edge of the mirror plate can be pressed to a greater or lesser degree against the abutment. In this manner a fine adjustment of the arrangement of the ends of the parabolic webs relative to the clamping section carriers is possible, with this relative clamping being most expediently effected via an adjustment screw threaded into the rotary bearing.

As each individual parabolic web is a relatively unstable structure in its own right, in particular against bending in its plane, a further development of the invention provides that in each case two neighbouring parabolic webs which are arranged spaced apart, are connected together by connection webs to form a constructional unit. In this way box-like profiled structures are formed which have a very high inherent stability, which is further increased on mounting them on the clamping section supports. The parabolic webs and the mirror plates are stabilized by mutually clamping or bracing them together via the clamping section supports.

A particularly expedient constructional embodiment is characterized in that the two clamping section supports are supplemented at said two ends by connection members into a frame, with the connection between the clamping section supports and the connection members being releasable and being laid out in such a way that the clamping section supports are pivotable about the swivel axis into the release position or into the clamping position as desired.

A further advantageous embodiment is characterized in that the clamping section supports are secured at their ends, diametrically, to stiff circular rings, optionally via the connection members, with the axes of the circular rings extending parallel to the parabolic axis and with their diameter substantially corresponding to the spacing of the two clamping section supports. With this arrangement is is particularly expedient for the circular rings to be mounted on rollers and for them to be rotatable in controlled manner about their common axis. The stiff circular rings are thus simultaneously used to hold the solar mirror arrangement and also for the controlled rotation thereof. The controlled rotation ensures that the solar radiation falls at each point in time in the ideal direction exactly from the front onto the solar mirror arrangement so that the solar energy is extensively concentrated onto the radiation receiver which is located at the focal line. The latter is expediently secured to the circular rings opposite to the mirror plates.

The precise cutting of the parabolic edges of the parabolic webs does not throw up any technical problems, it is straight-forwardly possible, in accordance with a specially preferred embodiment of the invention, for the parabolic edge of the parabolic webs to be of precise parabolic shape, which can for example be achieved by stamping the parabolic webs out of sheet metal using an appropriately shaped stamping tool. The invention thus makes it possible to realize parabolic mirrors which concentrate the sunlight onto the radiation receiver in a particularly precise manner.

The invention will now be described in the following by way of example and with reference to the drawings in which are shown.

Figure 1:
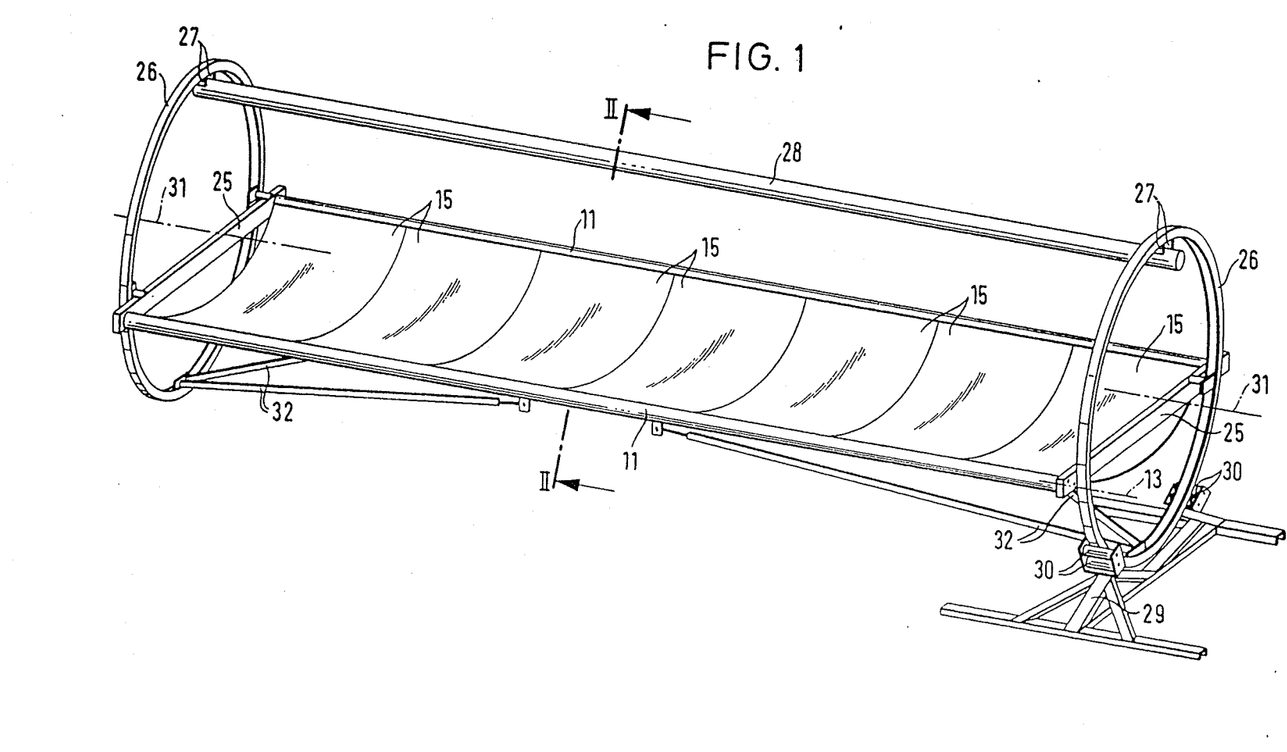
FIG. 1 a schematic perspective overall view of a solar mirror apparatus in accordance with the invention, FIG. 2 a schematic sectional view essentially on the line II—II of FIG. 1, FIG. 3 a schematic view of a solar mirror apparatus in accordance with the invention in the direction of the arrow III in FIG. 2, FIG. 4 the section IV from FIG. 2 to an enlarged scale, FIG. 5 the section V in FIG. 4 to illustrate the components essential for the function of the device however to an enlarged scale, with the clamping section support being shown in broken lines in the released position and in full lines in the clamping position, FIG. 6 a view of the subject of FIG. 4 in the direction of the arrow VI in FIG. 4, with the mirror plate 15 being partly broken away, and FIG. 7 a schematic side view of a solar mirror apparatus in accordance with the invention and consisting of several units placed together.

As seen in FIG. 1 base frames 29 are provided at the end faces of a solar mirror apparatus in accordance with the invention, with only the base frame provided at the right hand end face being shown in FIG. 1. These base frames 29 are arranged on the ground. Plastic rollers 30 with horizontal axes of rotation are rotatably secured, circumferentially spaced apart, on the base frames 29. A circular ring 26 consisting of steel is mounted on the rollers for rotation about its horizontally extending central axis 31, but is however constrained axially. The rotational drive of one of the circular rings 26 can be effected (in a manner which is not illustrated) by means of an electric motor via a transmission with a very high stepdown transmission ratio, or via a transmission which acts on the periphery of the circular ring 26.

Horizontal connection beams or members 25 are mounted at the half heights of the circular rings 26, extend diametrically across the circular rings 26, and carry elongate clamping section supports 11 at their ends which project somewhat outwardly beyond the circular rings 26. The clamping section supports extend from the connection member 25 of one circular ring 26 to the connection member 25 of the second circular ring 26 which is arranged spaced at a considerable axial distance from the first circular ring 26. Thin and resiliently flexible sheet metal mirrors 15 which are of a parabolically curved shape are arranged between the two clamping section supports 11 which extend parallel to one another in a manner which will now be described in more detail in the following. Between the two circular rings 26, which are illustrated in FIG. 1, there are located, in direct contact with one another and with the connection members 25 a total of seven sheet metal mirrors 15. These mirrors have a rectangular shape in the non-curved state, with the longer side of the rectangle extending in the direction which will later form the circumference.

Stiffening struts 32 extend from the lower regions of the circular rings 26 to the central regions of the two clamping section supports 11 in order to provide an overall arrangement which is as stiff as possible against bending and twisting.

Figure 2:
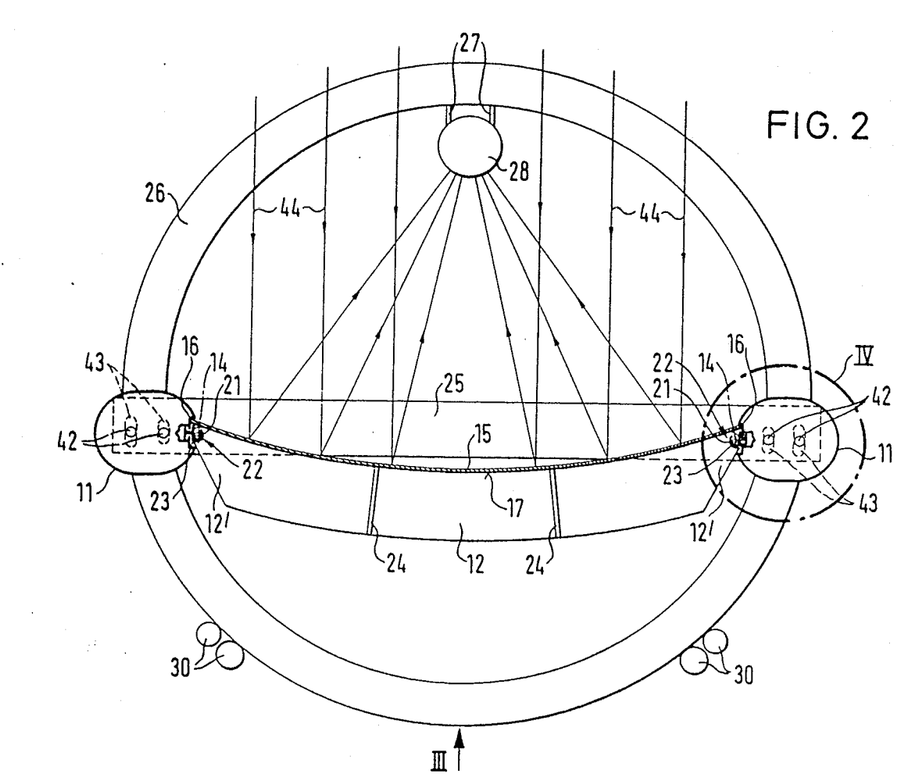
Figure 3:
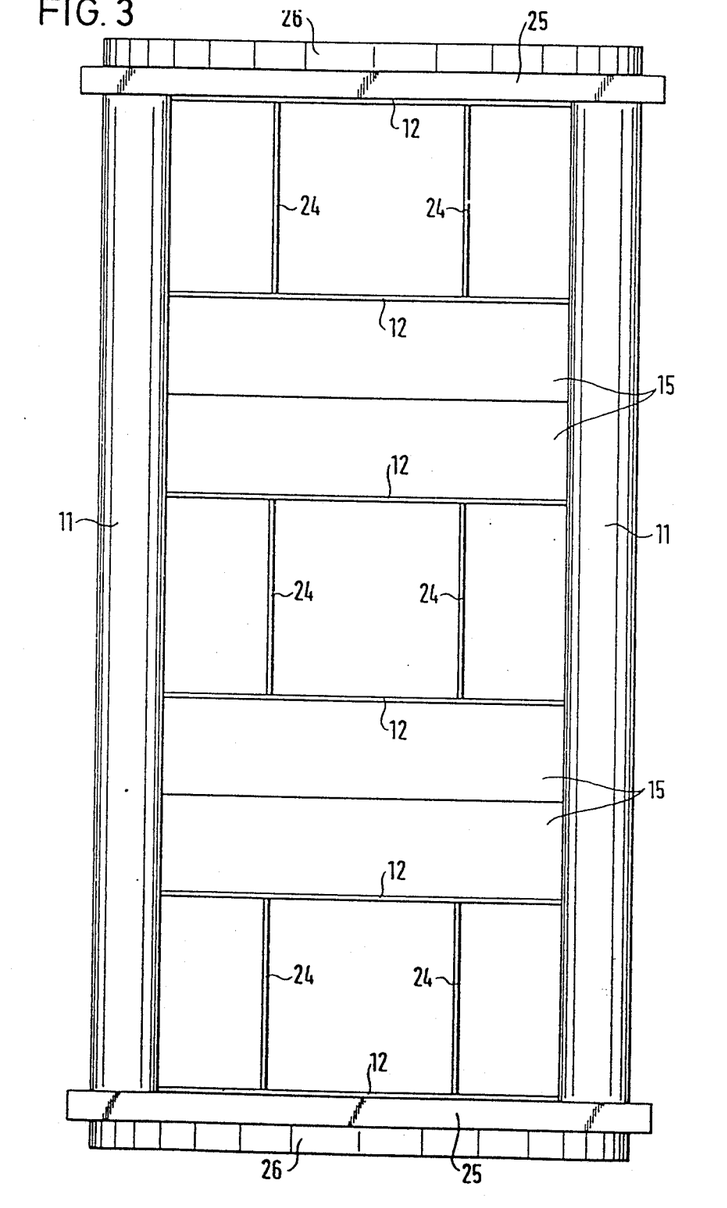
Figure 4:
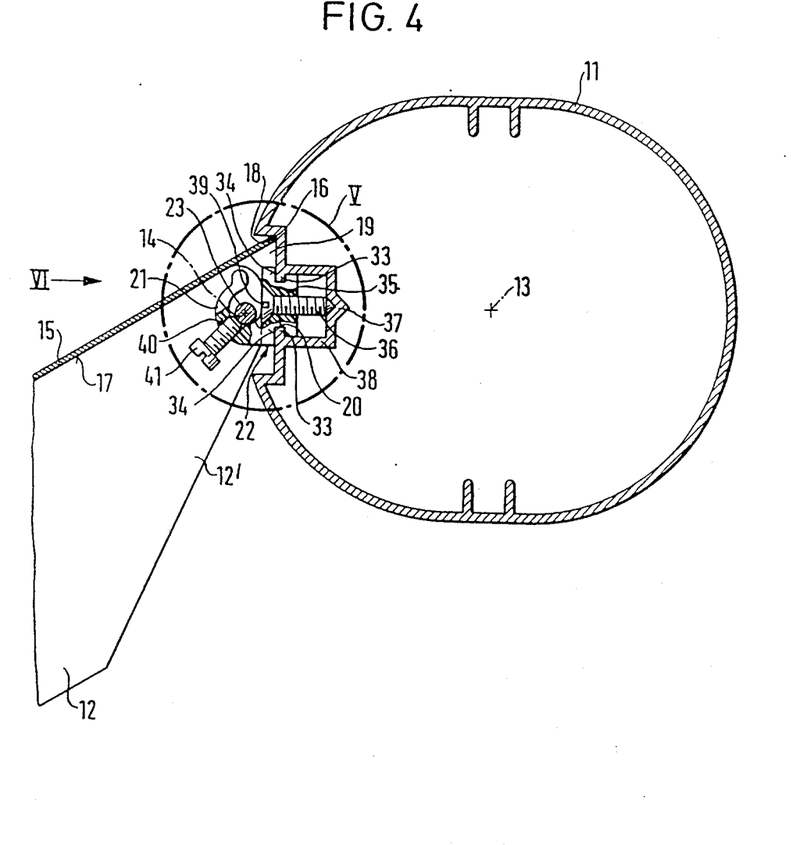

As seen in FIGS. 2 to 4 parabolic webs 12 are arranged behind the sheet metal mirrors 15 and each have a parabolic edge 17 which faces the sheet metal mirrors 15. The parabolic webs 12 and their parabolic edges 17 extend in the circumferential direction of the sheet metal mirrors 15.

In FIG. 3, in contrast to FIG. 1, only three sheet metal mirrors 15 are shown alongside one another for the sake of simplicity. The same reference numerals are used to designate corresponding components in all embodiments.

As seen in FIG. 3 pairs of parabolic webs 12 which are arranged alongside and spaced apart from one another are connected to one another and into a larger constructional unit by connecting webs 24 which extend in the longitudinal direction of the arrangement. As seen in FIG. 3 three such constructional units are provided spaced apart alongside one another. The flat surfaces of the parabolic webs 12 and of the connecting webs 24 are perpendicular to the cylindrical parabolically curved mirror surfaces 15.

In accordance with FIGS. 2 and 4 a swivel pin or trunnion 23 extending parallel to the parabolic axis is arranged at the acute angled tapering ends 12′ of each parabolic web 12, right at the ends thereof. In accordance with FIG. 6 the swivel pin 23 projects at both sides beyond each parabolic web and engages in swivel mounts 21 provided on each side of each parabolic web. The swivel mounts are provided on sliders 22 which are displaceably arranged in the longitudinal direction in the clamping section carriers 11. For this purpose the clamping section supports 11 have, in accordance with FIG. 4, a groove-like cut-out 19 in the base of which is formed a longitudinal slot 20. The ribs 33 which form the marginal edges of this elongate slot 20 are engaged around by guide grooves 34 of the slider 22 to form a sliding seat in such a way that the sliders 22 are securely held on all sides on the clamping section support 11, but are however displaceable in the longitudinal direction. The one half of this slider 22 has a threaded bore 35 into which a clamping screw 36 is threaded the end of which can be pressed against the base 37 of a clamping web 38 provided on the clamping section support 11. The screw has a screwdriver slot 39 in its head, by means of which the screw can be actuated by a screwdriver, and clamped against the base 37 of the clamping web 38 when the slider 22 is to be fixed at a specific position along the longitudinal extent of the clamping section support 11.

Figure 6:
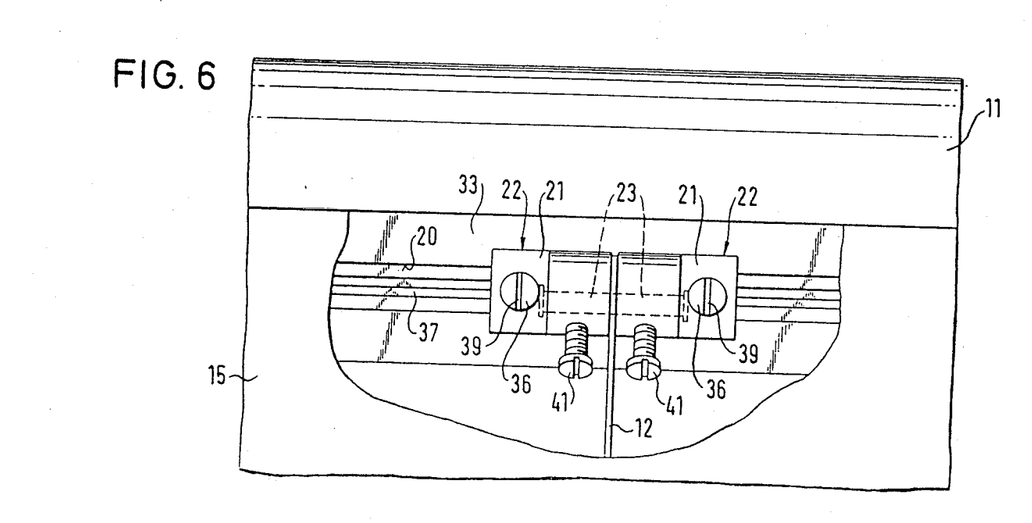

The swivel mount 21 is formed on each slider 22 adjacent the threaded bore 35 and extends somewhat beyond the external periphery of the clamping section support 11, in a direction towards the sheet metal mirrors 15, and there engages around the swivel pin 23 which is pushed through the parabolic webs 12. On the inner side of each swivel mount there is located a threaded bore 40 which is directed approximately tangential to the parabolic surface at this position through which an adjustment bolt 41 is threaded the end of which is braced on the external periphery of the swivel pin 23. The ideal situation would be a threaded bore which lies normal to the imaginary connection line of the two opposite bores of a parabolic web so that no strains (forces) are subsequently introduced into the parabolic web. The threaded bore should be executed according to the geometrical shape of the clamping section.

The arrangement of the parabolic webs 17 on the swivel mount 21 of the slider 22 by means of the swivel pins 23 is such that the tangent to the parabolic edge 17 in the end region of each parabolic web 12 is directed essentially into the upper corner edge of a groove-like cut-out 19. In this way it is possible that the end corners 18 of the sheet metal mirrors 15, which are laid in curved form on the parabolic edges 17 of the parabolic webs 12, can lie within this corner edge which thus forms a compressive abutment 16 for the end edges 18.

In accordance with the invention as seen in FIG. 6, each parabolic web 12 is surrounded by two sliders 21 of mirror symmetrical construction which clamp the parabolic web 12 between them and simultaneously fix its perpendicular position relative to the mirror surfaces 15.

As seen in FIG. 2 the clamping section supports 11 are swivellably mounted at their end faces on the connection members 25 so that they are swivellable about the swivel axis 14 of the swivel pins 23. For this purpose securing spigots 42 which are only schematically illustrated can be provided at the end faces of the clamping section supports 11, with these securing spigots 42 engaging in elongate slots 43 in the connection members 25 and with these elongate slots 43 being illustrated in broken lines and being curved around the swivel axis 14. The securing spigots 42 can be constructed as bolts (not illustrated) and can be fixed in a specific swivel position relative to the connection members 25.

By releasing the nuts which are not illustrated but are arranged on the bolts 42 the clamping section supports 11 can be swivelled about the swivel axis 14.

An elongate radiation receiver 28 is arranged in accordance with FIG. 1 opposite to the connection members 25 and the sheet metal mirrors 15 and is secured via securing webs 27 to the two spaced apart stiff circular rings 26.

In accordance with FIG. 2 the parallel sunlight 44 which is incident from the front onto the sheet metal mirrors 25 is concentrated at the focal line of the sheet metal mirror 25 where the radiation receiver 28 is arranged.

As seen in FIG. 4 the swivel axis 14 of each clamping section support 11 extends parallel to its longitudinal axis 13.

Figure 5:
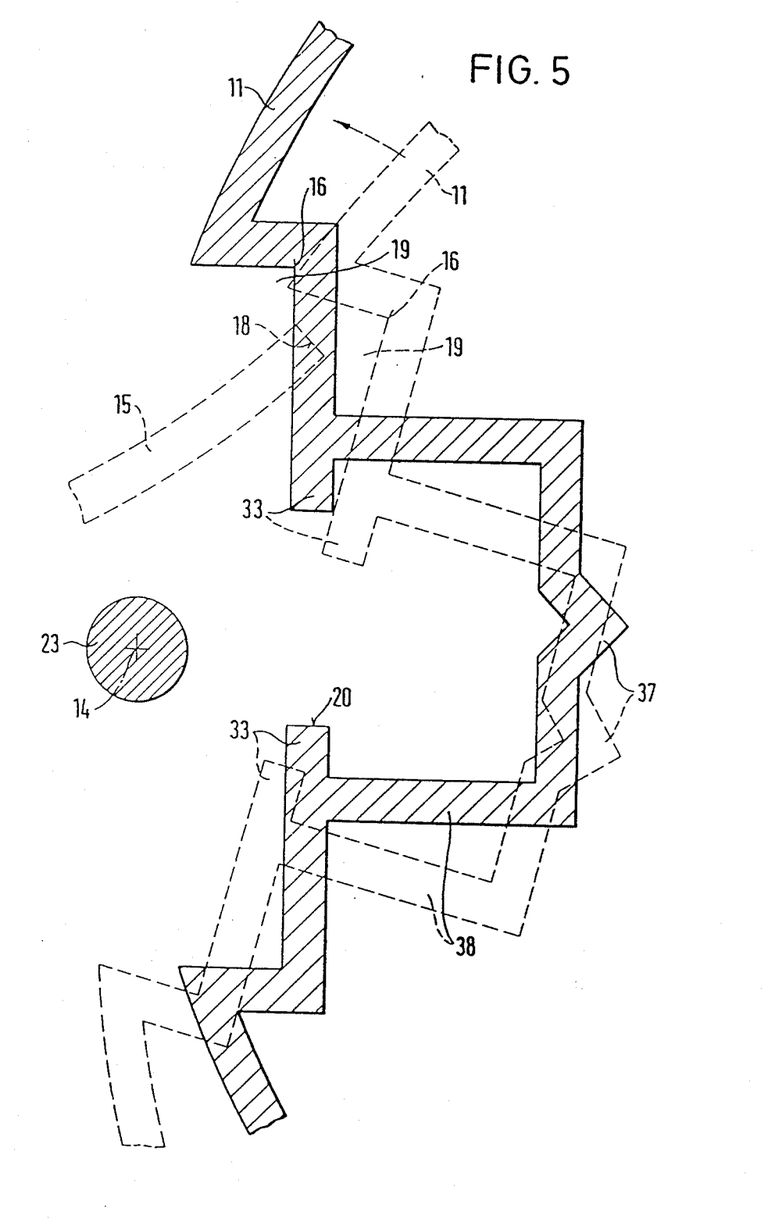

The installation of the solar mirror arrangement in accordance with the invention proceeds as follows:

After all components with the exception of the sheet metal mirrors 14 have been assembled together in the manner which can be seen from FIG. 1 the clamping section supports 11 are loosened relative to the connection members 25, by releasing the securing nuts in the region of the connection members 25, so that they can be swivelled about the swivel axis 14 in accordance with FIG. 5 into the opened position illustrated in broken lines. This swivelling movement takes place in such away that the compressive abutment 16 is removed from the position to be adopted by the end eges 18 of the sheet metal mirrors 15 after installation is complete.

The sheet metal mirrors 15 are now laid onto the parabolic edges 17 of the parabolic segments 12 so they adopt approximately the position which can be seen in broken lines in FIG. 5 in which the end edges 15 still have a certain small spacing from the compressive abutment 16 so that this insertion can be effected in a problem free manner. As soon as all the sheet metal mirrors have been laid directly alongside one another onto the cylinder segments 12 which have previously been installed at suitable spacings the clamping section supports 11 are swivelled in the direction of the broken line arrow of FIG. 5, so that the compression abutments 16 come into contact with the end edges 18 of the sheet metal mirrors 15. On further swivelling of the clamping section supports, into the clamping position shown in solid lines in FIG. 5, the sheet metal mirrors 15 are securely pressed in form fitted manner against the parabolic edges 17 of the cylinder webs 12. In this manner the sheet metal mirrors 15 which are flexible in their own right and do not have any defined shape precisely adopt the curved shape of the parabolic edges 17 of the cylinder segments 12 which expediently represents a parabola. In the clamping position of the clamping section supports 11 which are shown in solid lines in FIG. 5 and in the remaining Figures the clamping section supports are fixed in the clamping position to the connection members 25 by tighting the nuts at the connection point, so that a precisely aligned and optically problemfree parabolic mirror arrangement is now present.

Should a certain degree of malalignment be present between the parabolic webs 12 and the clamping section support 11 in the region of one or other slider 21 then this can be accurately removed without problem by rotating the corresponding adjustment screw 41.

Dismantling takes place in the reverse sense.

The installation of the parabolic webs 12 is correspondingly simple. The parabolic webs 12 which have been assembled into larger constructional units in accordance with FIG. 3 are hung by means of the swivel pins 23 into the swivel mount 21 which are preferably upwardly open and the overall arangements can be brought precisely into the correct position by lateral displacement of the sliders 21. The sliders 21 are then pressed from both sides against the associated parabolic webs 12 and can be fixed in this position by screws 36.

The fine adjustment can then take place by rotating the adjustment screws 41.

Figure 7:
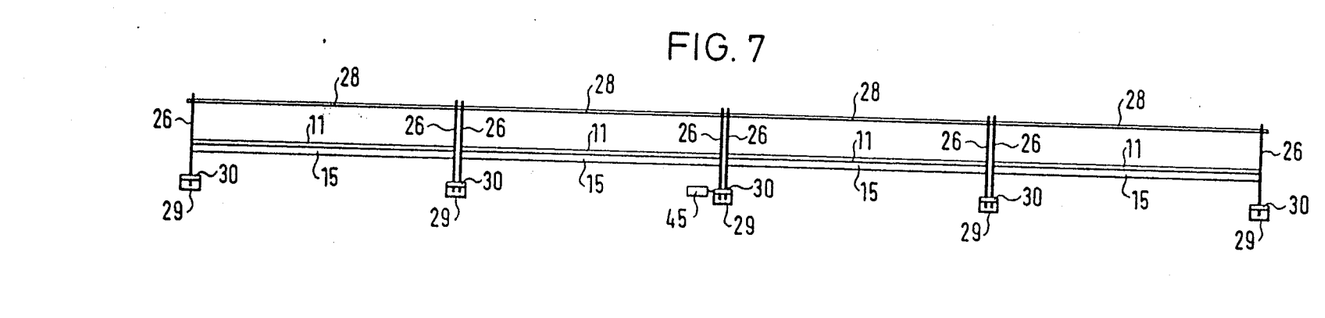

In accordance with FIG. 7 several solar mirror arrangements in accordance with FIG. 1 can be arranged behind one another and can be rotationally coupled together in a suitable manner. In this way a single motor 45 is sufficient for driving all the coupled solar mirror arrangements.

The, webs 12 could also deviate from the parabolic shape and could for example be approximately circular when only the predominant part of the solar radiation falls onto the radiation receiver 28.

I claim:

1. A solar mirror apparatus, comprising:
   an elongate carrying frame, having a longitudinal axis, adapted to be rotated about said longitudinal axis;
   first and second clamping section supports, spaced apart and disposed parallel to said longitudinal axis, each said support including an elongate abutment, parallel to and facing said longitudinal axis, adapted to exert a compressive force, and further including an elongate slot, parallel to said longitudinal axis;
   means for adjustably connecting said supports to said frame such that each said support can swivel about a support swivel axis parallel to said longitudinal axis;
   a parabolic web including first and second parallel sides, each said side including a swivel pin defining a web swivel axis parallel to said longitudinal axis;
   first and second pivotal connecting means for pivotally connecting said web to said supports, each said pivotal connecting means adapted to slidadably attach to a said support and rotably engage a said swivel pin, thereby pivotally connecting said web to said supports;
   an elastically flexible sheet metal mirror having first and second parallel sides, adapted to be releasably held against and conformed to the shape of said parabolic web, said mirror sides contacting said abutments and being forced by the compressive force exerted by said abutments to conform to the parabolic shape of said web, an upper surface of said mirror defining a parabolic mirror having a focal line parallel to said longitudinal axis when so shaped; and
   an elongate radiation receiver, held by said frame and disposed at said focal line, for receiving solar radiation reflected by said mirror;
   said means for adjustably connecting allowing the supports to be swiveled to a release position permitting said mirror to be placed on or removed from said web, whereupon said means for adjustably connecting is tightened placing said supports in a mirror retaining position,
   said pivotal connecting means controlling the contact between said mirror sides and said abutments, and controlling thereby the compressive force exerted by said abutments to force said mirror to assume the parabolic shape of said web;
   said frame being rotated to cause said mirror to face the sun.

2. The solar mirror apparatus of claim 1, wherein said frame further includes first and second connection members, each said connection member connecting an end of said clamping section supports to said frame, and wherein said means for adjustably connecting permits said clamping section supports to be pivoted about said support swivel axis into said release position or said mirror retaining position.

3. The solar mirror apparatus of claim 1, wherein each said support has a substantially hollow ellipsoidal shape defining a groove-like cut-out having an edge at a side supporting said mirror edge, and wherein said abutment is formed from a corner edge of said groove-like cut-out.

4. The solar mirror apparatus of claim 1, wherein said frame is controllably rotated about said longitudinal axis such that said mirror is directed towards the sun.

5. The solar mirror apparatus of claim 1, wherein said mirror includes a flexible sheet of metal covered with a reflective foil.

6. The solar mirror apparatus of claim 1, wherein said pivotal connecting means are sliders which are longitudinally displaceably held in said elongate slot.

7. The solar mirror apparatus of claim 6, wherein said sliders may be fixed in any position along said clamping section supports.

8. The solar mirror apparatus of claim 6, wherein said web includes a plurality of spaced apart webs and a connection web for joining said spaced apart webs into a single web unit.

9. The solar mirror apparatus of claim 1, wherein said frame further includes first and second stiff circular rings having a diameter substantially the same as the distance separating said clamping section supports, an imaginary axis connecting a center of each ring being parallel to said longitudinal axis, said rings being secured to the ends of said clamping section supports by said means for adjustably connecting.

10. The solar mirror apparatus of claim 9, wherein said receiver is secured to said rings such that said receiver faces said mirror.

11. A solar mirror apparatus, comprising:
    an elongate carrying frame, having a longitudinal axis, adapted to be rotated about said longitudinal axis;
    first and second clamping section supports, spaced apart and disposed parallel to said longitudinal axis, each said support including an elongate abutment, parallel to and facing said longitudinal axis, adapted to exert a compressive force, and further including an elongate slot, parallel to side longitudinal axis;
    first and second slider means, adapted to slidably engage in a said slot and be longitudinally displaceably held therein, each said slider means including a pivot bearing;
    means for adjustably connecting said supports to said frame such that each said support can swivel about a support swivel axis parallel to said longitudinal axis;
    a parabolic web including first and second parallel sides, each said side including a swivel pin adapted to engage a said pivot bearing in said slider means, said swivel pin and pivot bearing defining a web swivel axis parallel to said longitudinal axis;
    an elastically flexible sheet metal mirror having first and second parallel sides, adapted to be releasably held against and conformed to the shape of said parabolic web, said mirror sides contacting said abutments and being forced by the compressive force exerted by said abutments to conform to the parabolic shape of said web, an upper surface of said mirror defining a parabolic mirror having a focal line parallel to said longitudinal axis when so shaped; and an elongate radiation receiver, held by said frame and disposed at said focal line, for receiving solar radiation reflected by said mirror;

said means for adjustably connecting allowing the supports to be swiveled to a release position permitting said mirror to be placed on or removed from said web, whereupon said means for adjustably connecting is tightened placing said supports in a mirror retaining position, said pivotal connecting means controlling the contract between said mirror sides and said abutments, and controlling thereby the compressive force exerted by said abutments to force said mirror to assume the parabolic shape of said web;

said frame being rotated to cause said mirror to face the sun.

12. The solar mirror apparatus of claim 11, wherein said pivot bearings and said swivel pins are adapted to be clamped against one another substantially in the direction of a tangent to the parabolic shaped upper surface of said mirror, at a location of said pivot bearings and swivel pins, said clamping being in a direction in which said mirror sides compressively contact said abutments.

* * * * *